United States Patent [19]

Finkenzeller et al.

[11] Patent Number: 4,961,000
[45] Date of Patent: Oct. 2, 1990

[54] CASSETTE FOR AN X-RAY LUMINESCENT STORAGE SCREEN

[75] Inventors: Johann Finkenzeller, Erlangen; Guenter Hubert, Baiersdorf, both of Fed. Rep. of Germany

[73] Assignee: Siemens Aktiengesellschaft, Berlin and Munich, Fed. Rep. of Germany

[21] Appl. No.: 367,672

[22] Filed: Jun. 19, 1989

[30] Foreign Application Priority Data

Jun. 21, 1988 [DE] Fed. Rep. of Germany ... 8807986[U]

[51] Int. Cl.$^5$ ............................................. G03B 42/04
[52] U.S. Cl. .................... 250/484.1; 378/187
[58] Field of Search ......................... 250/484.1, 327.2; 378/187

[56] References Cited

U.S. PATENT DOCUMENTS 2,694,153  11/1954  Reuter ................................. 378/185

Primary Examiner—Carolyn E. Fields
Attorney, Agent, or Firm—Hill, Van Santen, Steadman & Simpson

[57] ABSTRACT

A cassette for holding a luminescent storage screen, in which an x-ray image is latently stored, has a housing with a cover consisting of a flexible, ferromagnetic material, to which the storage screen is attached. At least regions of the housing also consist of a ferromagnetic material, with the cover and the housing regions being magnetized. The cover with the screen attached thereto is thus held in place in the cassette in a light-tight fashion.

8 Claims, 1 Drawing Sheet

CASSETTE FOR AN X-RAY LUMINESCENT STORAGE SCREEN

BACKGROUND OF THE INVENTION

1. Field of the Invention

The present invention is directed to an x-ray cassette suitable for holding a luminescent storage screen, in which a latent x-ray image is stored.

2. Description of the Prior Art

An x-ray cassette is disclosed in U.S. Pat. No. 4,521,904 wherein an x-ray film and a foil of a luminescent storage screen are placed in a light-tight housing. The housing includes a base and a cover lined with resilient layers. The x-ray film is inserted in the cassette and a hinged cover is closed.

Another x-ray film cassette is described in German Patent No. 1 112 887, wherein the cassette cover consists of a flexible magnetic material, and the x-ray film is place loosely in the cassette, and is pressed against the cassette base by magnetic force.

A luminescent storage screen is described in European application No. 0 098 596 having a two-layer structure. The stimulable phosphor is contained in the first layer, with the second layer consisting of a magnetic material. In a readout device for the storage screen, the magnetic material permits the screen to be held by magnetic force, so that it can be moved by a conveyor, such as a belt.

SUMMARY OF THE INVENTION

It is an object of the present invention to provide an x-ray cassette for a luminescent storage screen which permits simple manipulation of the cassette during read-out of the latent image stored in the screen.

This object is achieved in accordance with the principles of the present invention in an x-ray cassette wherein the cover consists of flexible, ferromagnetic material, with the luminescent storage screen attached to the cover. At least regions of the cassette housing also consist of ferromagnetic material, and the cover and/or the housing regions are magnetized. This assures that the luminescent storage screen is simultaneously inserted in the cassette with the closing of the cover. The storage screen is also simultaneously removed from the cassette when the cassette cover is opened. The cover with the storage screen attached thereto can then be introduced into a conventional read-out device using a magnetic conveyor. A simple structure of the cassette and the storage screen are thus obtained, because the cover simultaneously functions as a ferromagnetic carrier for the storage screen.

A reliable closure and light-tight structure of the cassette are obtained in an embodiment wherein the housing has a cassette base, and a cassette frame which surrounds the cassette base, with a magnetic frame disposed within the cassette frame. A reliable closing is obtained by the cover projecting laterally beyond the storage screen. A reliable retaining of the storage screen is achieved by having the opening of the magnetic frame being of the same size as the storage screen, so that the cover rests flush on the magnet frame.

A light weight structure of the x-ray cassette is achieved in an embodiment wherein the cassette frame and magnetic frame each consist of plastic, with permanent magnets being set into the magnet frame. A stable structure of the cassette is achieved wherein the cassette floor consists of carbon fiber material. The cover may consist of sheet steel coated with a foil, to obtain a stable structure.

DESCRIPTION OF THE PREFERRED EMBODIMENTS

Figure 1:
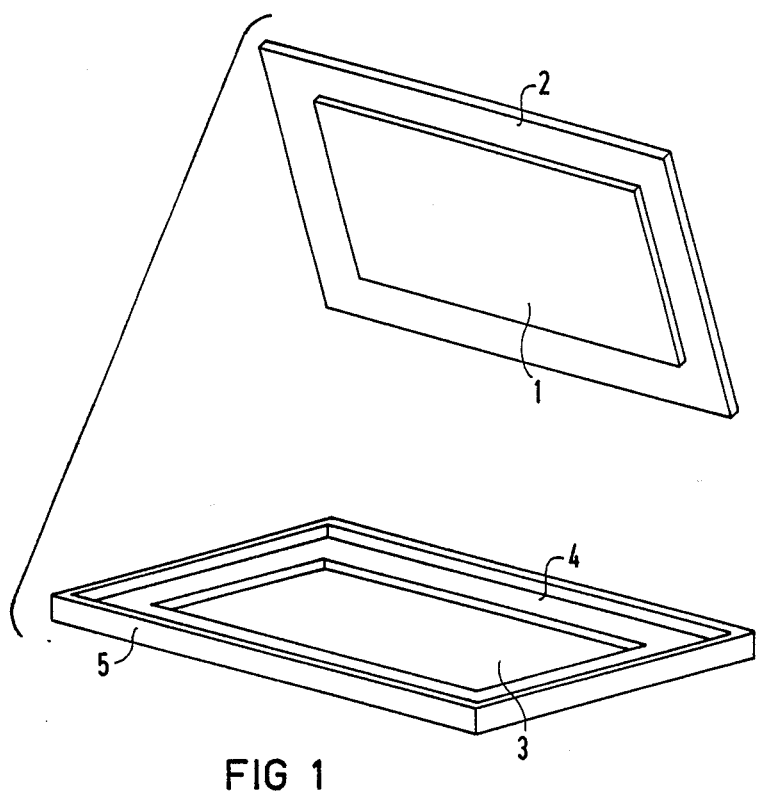
FIG. 1 is a perspective view of an x-ray cassette constructed in accordance with the principles of the present invention with the cover removed.

As shown in FIG. 1, an x-ray cassette constructed in accordance with the principles of the present invention includes a cover 2 consisting of flexible, ferromagnetic material, and a housing. The housing includes a cassette base 3, a magnet frame 4, and a cassette frame 5 which surrounds the magnet frame 4. A luminescent storage screen 1 is firmly applied to the cover 2, for example, by gluing. The magnet frame 4 has an opening corresponding in size to the storage screen 1, so that the cover 2 rests fully on the magnet frame 4, with the storage screen being situated inside the opening of the magnet frame 4. This permits the cover 2 to lie flat or flush, and also provides a light-tight closure.

Figure 2:
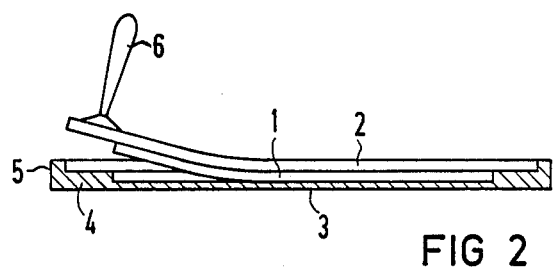
FIG. 2 is a side sectional view of a closed x-ray cassette constructed in accordance with the principles of the present invention.

The x-ray cassette is shown in cross-section in FIG. 2. A suction tool 6 is applied to the edge of the cover 2, for opening the x-ray cassette. The suction tool 6 detaches the flexible cover 2 from one side of the housing, and permits the cover 2 to be lifted and completely removed from the housing. The suction tool 6 may be used manually, or can be automatically applied using a machine. The cover 2 together the storage screen 1 can then be introduced into a conventional read-out device, for example, a device such as described in the aforementioned European application No. 0 098 596. Read-out of the luminescent storage screen 1 is then undertaken. After completion of the read-out, the cover 2 together with the storage screen 1 can be again inserted into the housing, so that the x-ray cassette can be used again. The cover 2 may consist of thin sheet steel coated with a foil for protection. For stability, the cassette base 3 may consist of carbon fiber materials. The cassette frame 5 may consist of plastic integrally cast to the cassette base 3. The inserted magnet frame 4 may similarly consist of plastic, in which permanent magnets are set. The magnet frame 4 and the cassette frame 5, however, may also be directly cast or extruded with the cassette floor as one unit. Irradiation of the luminescent storage screen 1 of the x-ray cassette ensues through the cassette base 3.

Alternatively, the cover 2 may also consist of magnetic material, for example permanent magnets embedded in rubber, so that the housing of the magnet frame 4 may consist of sheet steel, or of a plastic coated with iron foil.

Although modifications and changes may be suggested by those skilled in the art, it is the intention of the inventors to embody within the patent warranted hereon all changes and modifications as reasonably and properly come with in the scope of their contribution to the art.

We claim:

1. An x-ray cassette comprising:
   a housing having at least regions thereof consisting of ferromagnetic material;

a cover for closing said housing, said cover being completely separable and removable from said housing and consisting of flexible ferromagnetic material;

a luminescent storage screen for storing a latent x-ray image attached to said cover so that when said cover closes said housing, said screen is disposed within said housing and when said cover is removed from said housing said luminescent storage screen is removed therewith; and at least of said cover or said housing regions being magnetized.

2. An x-ray cassette as claimed in claim 1, wherein said housing comprises:
a cassette base;
a cassette frame surrounding said cassette base; and
a magnet frame within said cassette frame.

3. An x-ray cassette as claimed in claim 2, wherein said cover projects laterally beyond said storage screen.

4. An x-ray cassette as claimed in claim 3, wherein said magnet frame has an opening corresponding in size to said storage screen so that said cover lies flush on said magnet frame.

5. An x-ray cassette as claimed in claim 2, wherein said cassette frame consists of plastic.

6. An x-ray cassette as claimed in claim 2, wherein said magnet frame consists of plastic with a plurality of permanent magnets set therein.

7. An x-ray cassette as claimed in claim 2, wherein said cassette base consists of carbon fiber material.

8. An x-ray cassette as claimed in claim 1, wherein said cover consists of sheet steel coated with a foil.

* * * * *